(12) United States Patent
Wilson

(10) Patent No.: US 8,517,398 B1
(45) Date of Patent: Aug. 27, 2013

(54) LUGGAGE SUPPORT ASSEMBLY

(75) Inventor: Stancil Wilson, High Point, NC (US)

(73) Assignee: Bellman Ventures, High Point, NC (US)

( * ) Notice: Subject to any disclaimer, the term of this patent is extended or adjusted under 35 U.S.C. 154(b) by 0 days.

(21) Appl. No.: 13/447,282

(22) Filed: Apr. 15, 2012

(51) Int. Cl.
*B62B 1/12* (2006.01)
(52) U.S. Cl.
USPC ............... 280/38; 280/37; 280/641; 280/651
(58) Field of Classification Search
USPC ..................... 280/37, 38, 641, 651
See application file for complete search history.

(56) References Cited

U.S. PATENT DOCUMENTS

| | | | |
|---|---|---|---|
| 7,246,805 B2 * | 7/2007 | Neal et al. | 280/35 |
| 2003/0042711 A1 * | 3/2003 | Hsu | 280/651 |
| 2008/0272563 A1 * | 11/2008 | Tsai et al. | 280/38 |

* cited by examiner

*Primary Examiner* — Hau Phan
*Assistant Examiner* — Bryan Evans

(57) ABSTRACT

A luggage assembly is provided. The assembly includes a luggage component and a support assembly for use with the luggage component. The support assembly includes a support frame configured for extending from the luggage component between a first position and a second position extended from the luggage component and defining a support area therebetween for supporting additional luggage components and a pivotable device carried by the support frame and extending between spaced-apart wheel assemblies of the luggage component and configured for allowing pivotable movement of the luggage component about the support frame.

15 Claims, 6 Drawing Sheets

LUGGAGE SUPPORT ASSEMBLY

TECHNICAL FIELD

This disclosure is related to a luggage support assembly, and more particularly a luggage support assembly configured for allowing a user to support multiple luggage items for transport.

BACKGROUND

Luggage is used for containing clothing and other personal items such as, for example, when traveling at an airport or the like. Luggage comes in varying sizes and configurations and a user may carry multiple pieces to any given destination. Carrying multiple pieces of luggage to a destination can be cumbersome, particularly when the pieces of luggage are large, bulky, and heavy.

Many pieces of luggage may contain a wheeled assembly for allowing the user to roll the piece of luggage across a floor surface. The luggage may also contain a handle for providing a support surface for the user to grasp onto when rolling the luggage across a floor surface. These pieces of luggage are well-suited for transporting that particular luggage piece but are not suitable for transporting additional pieces of luggage because the luggage piece is generally held at an angle relative to the floor surface that makes stacking additional luggage pieces difficult.

Accordingly, a need exists for a new manner of transporting multiple pieces of luggage.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a luggage support assembly for use with a luggage component. The assembly includes a support frame configured for extending from the luggage component between a first position and a second position spaced-apart from the luggage component and defining a support area therebetween for supporting additional luggage components. The luggage component is pivotable relative to the support frame.

According to one or more embodiments, the support frame includes one or more telescopic assemblies.

According to one or more embodiments, the one or more telescopic assemblies cooperatively define the support area.

According to one or more embodiments, the support frame includes a pivotable joint at a first end thereof configured for extending between spaced-apart wheel assemblies of the luggage component.

According to one or more embodiments, the support frame defines one or more wheeled assemblies at a second end thereof.

According to one or more embodiments, the support frame further defines an end support that extends perpendicularly therefrom.

According to one or more embodiments, a luggage assembly is provided. The assembly includes a luggage component and a support assembly for use with the luggage component. The assembly includes a support frame configured for extending from the luggage component between a first position and a second position extended from the luggage component and defining a support area therebetween for supporting additional luggage components. The luggage component is pivotable relative to the support frame.

According to one or more embodiments, a luggage assembly is provided. The assembly includes a luggage component and a support assembly for use with the luggage component. The support assembly includes a support frame configured for extending from the luggage component between a first position and a second position extended from the luggage component and defining a support area therebetween for supporting additional luggage components and a pivotable device carried by the support frame and extending between spaced-apart wheel assemblies of the luggage component and configured for allowing pivotable movement of the luggage component about the support frame.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
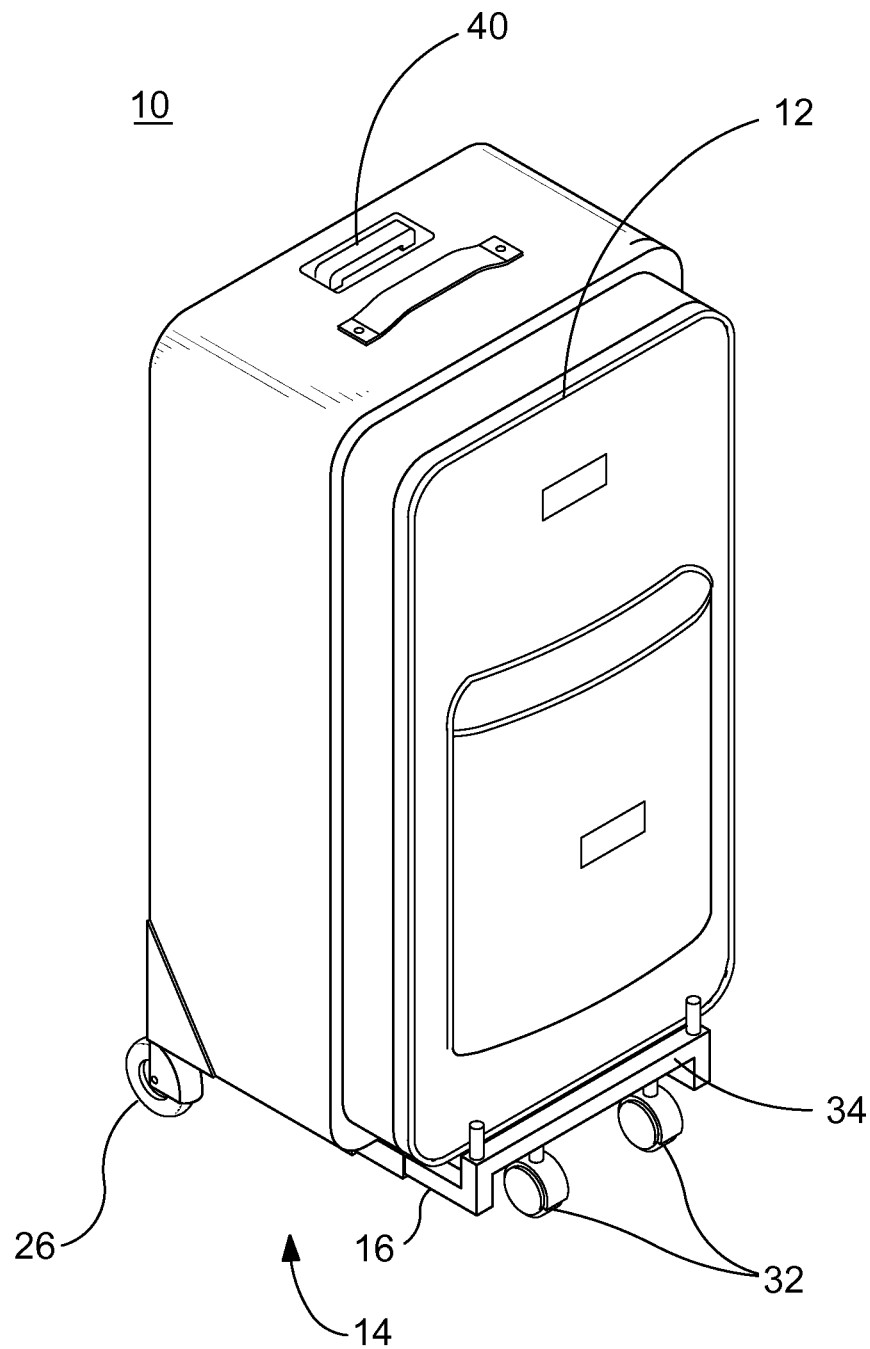
FIG. 1 illustrates a perspective view of a luggage assembly in a first position according to one or more embodiments disclosed herein.

FIG. 1 is a perspective view of a luggage assembly generally designated 10 throughout the drawings. The luggage assembly 10 includes a luggage component 12. The luggage component 12 may be a rollable suitcase as illustrated or may be any appropriately configured piece of luggage. The luggage component 12 may include a handle 40 or the like as commonly associated with conventional luggage components for providing a surface for a user to grasp to. The luggage component 12 may have a pair of spaced-apart wheel assemblies 26.

The luggage assembly 10 may further include a support assembly 14 for use with the luggage component 12. The support assembly 14 may include a support frame 16 that is configured for extending from the luggage component 12. The support frame 16 includes a first position as illustrated in FIG. 1 in which an end 34 thereof does not generally extend beyond the luggage component 12 and a second position as illustrated in FIG. 3 in which the support frame 16 extends beyond the luggage component 12.

Figure 2:
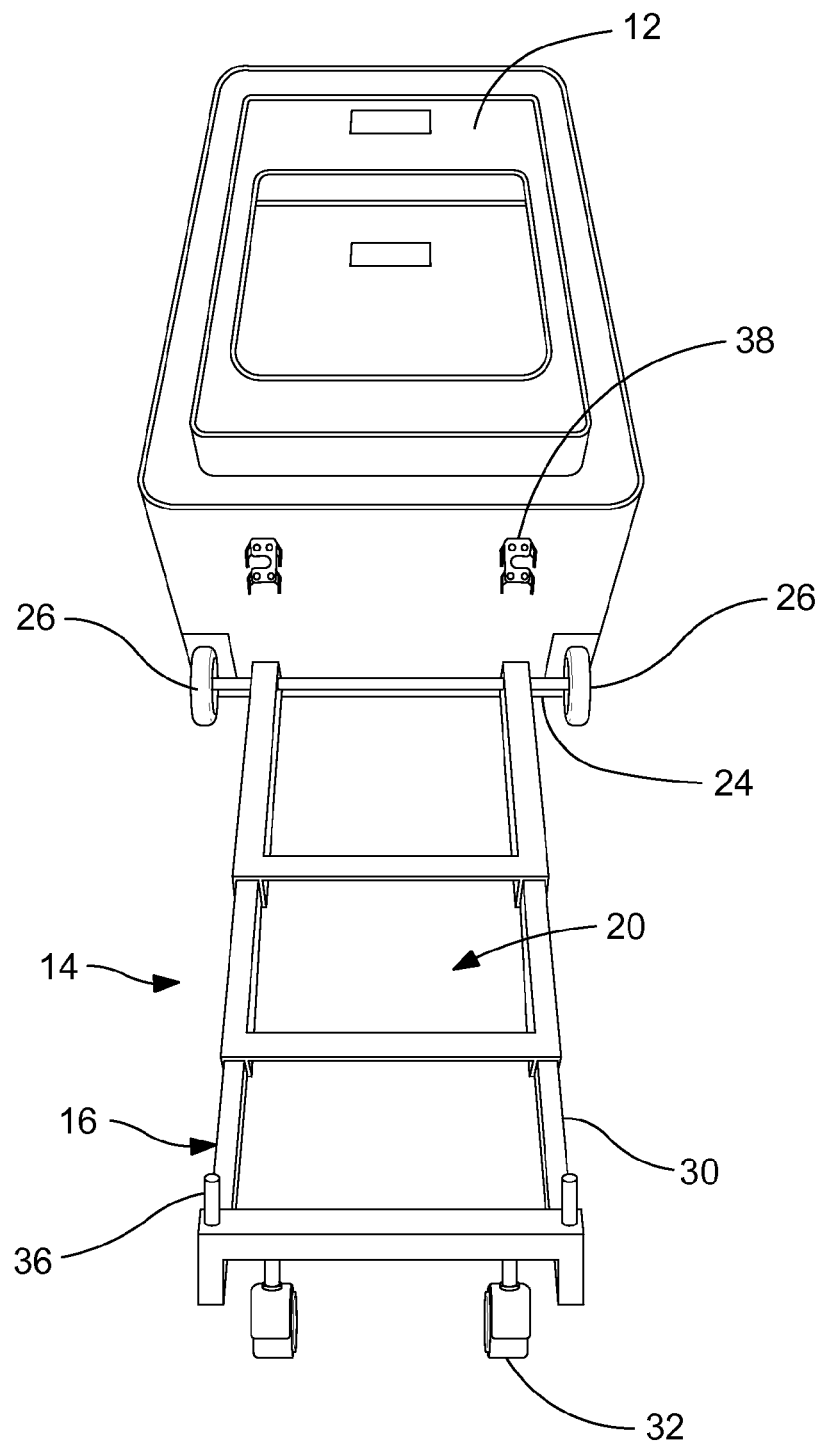
FIG. 2 illustrates a perspective view of a luggage assembly in a second position according to one or more embodiments disclosed herein.

As illustrated in FIG. 2, a pivotable device 24 is carried by the support frame 16. The pivotable device 24 may be any appropriately configured structure or design. The pivotable device 24 is illustrated as extending between spaced-apart wheel assemblies 26 of the luggage component 12. The pivotable device 24 is configured for allowing pivotable movement of the luggage component 12 about the support frame 16. The pivotable device 24 may take on any appropriately configured shape or design and is illustrated as a rod extending through centrally defined openings in the spaced-apart wheel assemblies 26.

Figure 3:
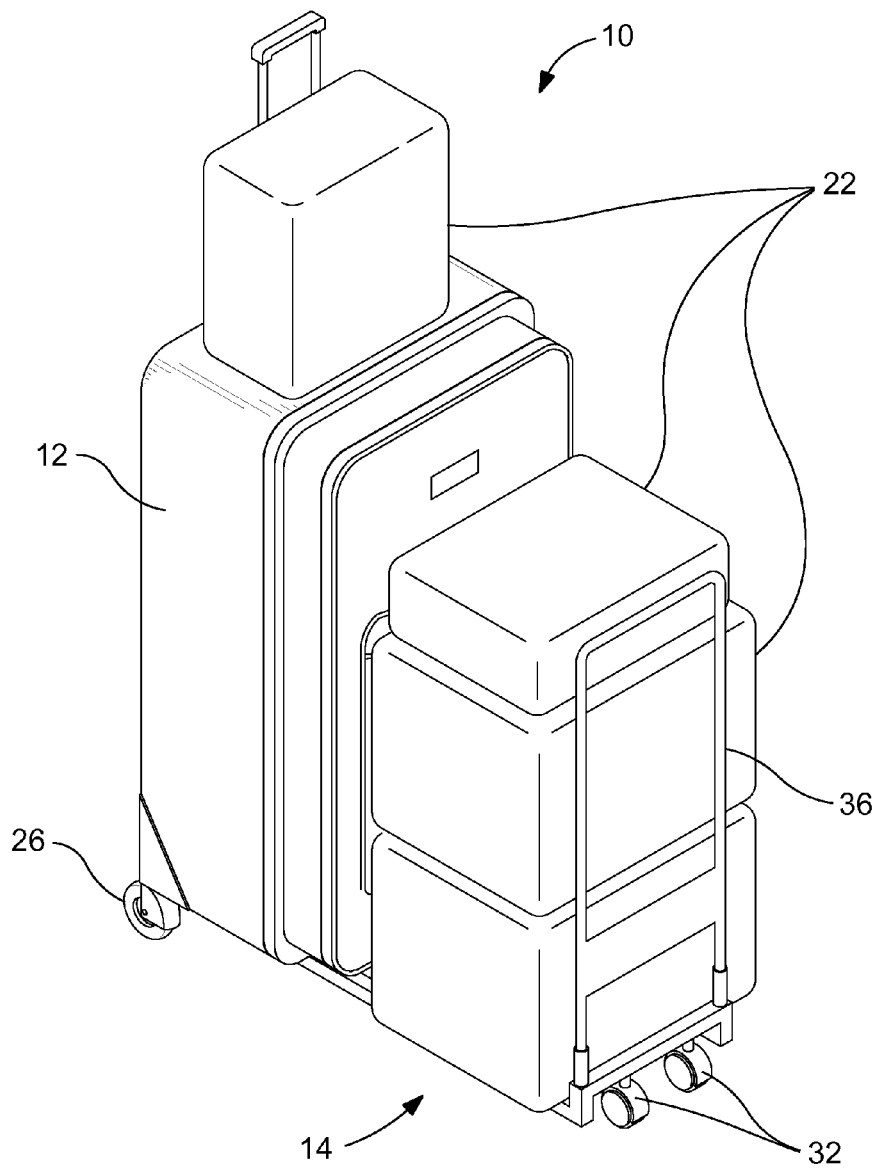
FIG. 3 illustrates a front-facing perspective view of a luggage assembly according to one or more embodiments disclosed herein.

The support frame 16 is illustrated as one or more telescopic assemblies 30 that cooperatively define a support area 20 that is provided for supporting additional luggage components 22 as illustrated in FIG. 3. The support frame 16 may define one or more wheeled assemblies 32 at the second end 34 thereof. Guide rails 38 on the luggage component 12 may be provided for receiving each of the telescopic assemblies 30 and providing guidance to the assemblies 30 when extended.

The support frame 16 may also include an end support 36 that extends perpendicularly therefrom for enclosing an end of the support area 20. As illustrated in FIG. 3, this may be a relatively rigid assembly or may be a similarly telescopic assembly that is configured for being extended from a retracted to an extended position. The end support 36 may be provided so that additional luggage components 22 may be stacked upon the support frame 16 in the support area 20 at an elevated height.

Figure 4:
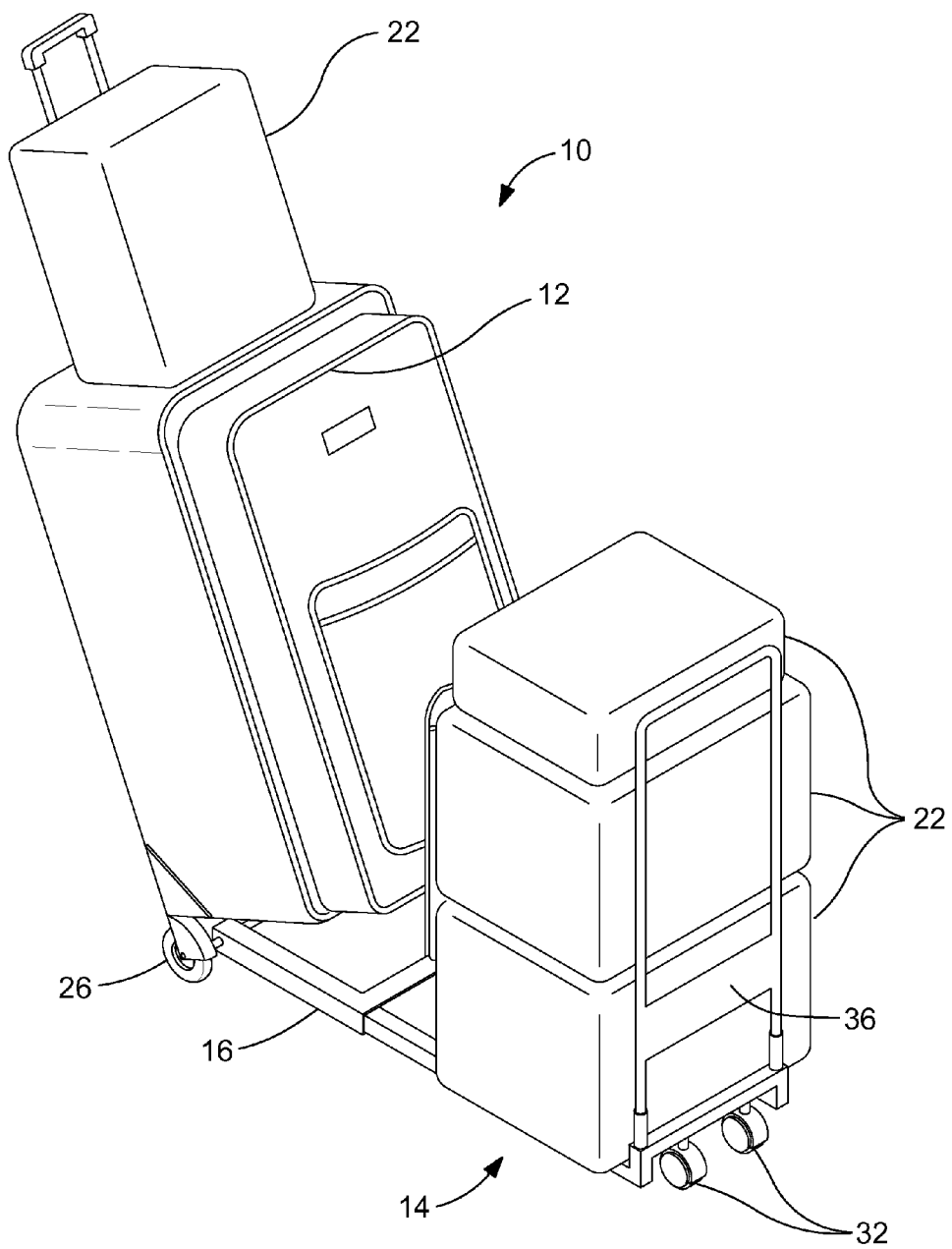
FIG. 4 illustrates a perspective view of a luggage assembly according to one or more embodiments disclosed herein.

The assembly 10 is particularly advantageous because of the pivotable capability of the support assembly 14 relative to the luggage component 12. In this manner, the user may stack additional luggage components 22 onto the support assembly 14 and then pivot the luggage component 12 into an angle appropriate for being pulled by the user as illustrated in FIG. 4. The advantage of this configuration is that the user can easily maneuver the assembly 10 while pulling on the handle 40 at an angle relative to the ground and that is comfortable for the user. The user operates the assembly 10 by extending the support assembly 14 from the first position to the second extended position. The end support 36 is then either installed upon the support assembly 14 or, with extendable or retractable versions, placed into an extended position. Additional luggage components 22 are then provided within the support area 20. Upon providing an appropriate number of additional luggage components 22, the user then pivots the luggage component 12 into a desired orientation and pulls the entire assembly 10 to a desired location by pulling on handle 40.

Figure 5:
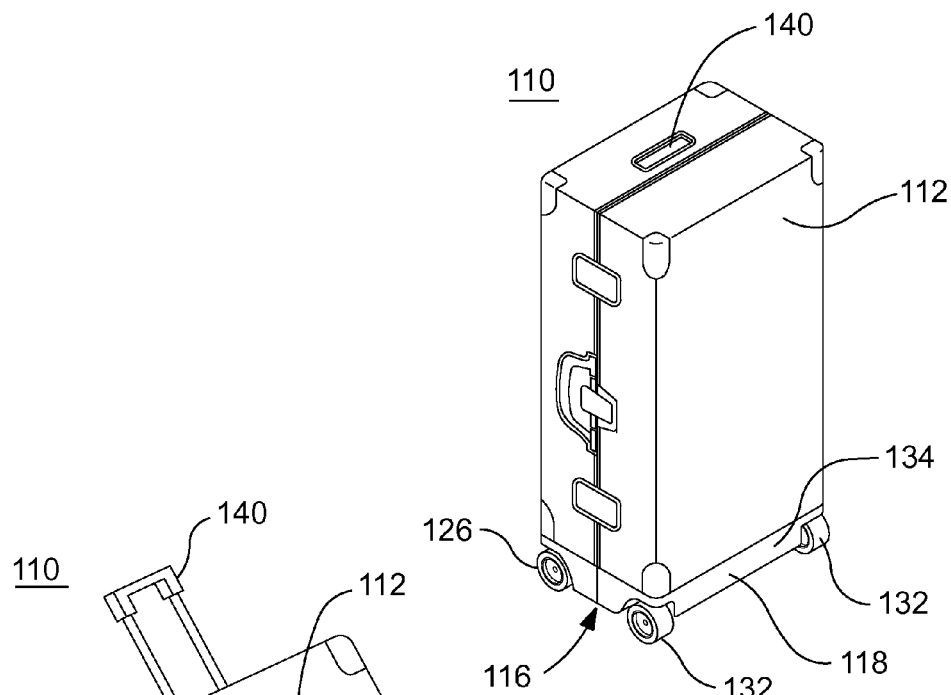
FIG. 5 illustrates a perspective view of a luggage assembly in a first position according to one or more embodiments disclosed herein.
Figure 6:
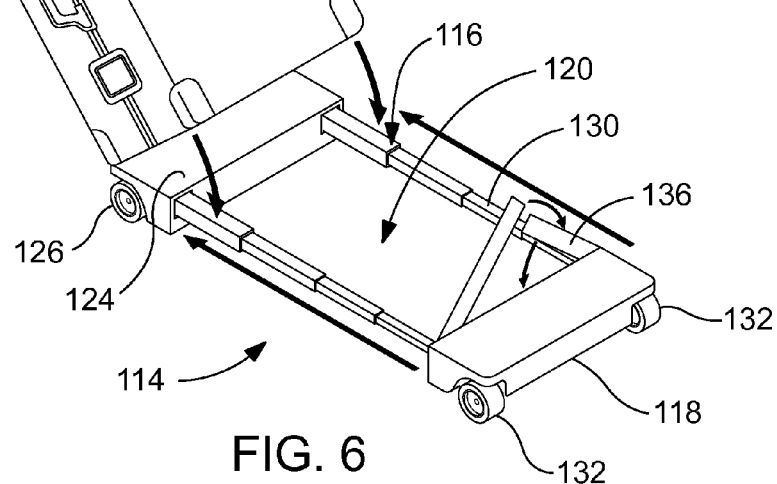
FIG. 6 illustrates a perspective view of a luggage assembly in a second position according to one or more embodiments disclosed herein.
Figure 7:
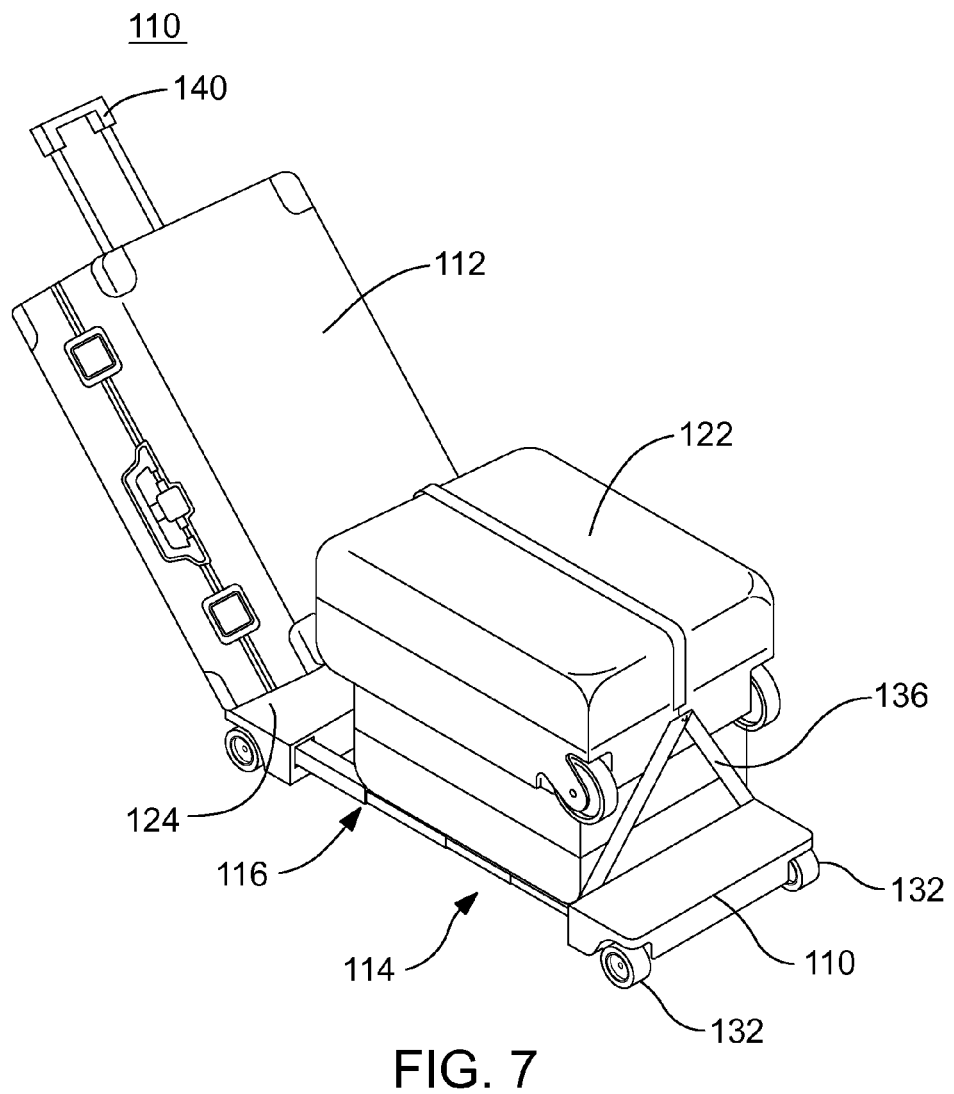
FIG. 7 illustrates a perspective view of a luggage assembly according to one or more embodiments disclosed herein.

An alternate embodiment of a luggage assembly is illustrated in FIGS. 5 through 7 and generally designated 110. The luggage assembly 110 shares many common elements and characteristics with luggage assembly 10. The luggage assembly 110 includes a luggage component 112. The luggage component 112 may be a rollable suitcase as illustrated or may be any appropriately configured piece of luggage. The luggage component 112 may include a handle 140 or the like as commonly associated with conventional luggage components for providing a surface for a user to grasp to. The luggage component 112 may have a pair of spaced-apart wheel assemblies 126.

The luggage assembly 110 may further include a support assembly 114 for use with the luggage component 112. The support assembly 114 may include a support frame 116 that is configured for extending from the luggage component 112. The support frame 116 extends about a wheeled cart 118 as illustrated. The wheeled cart 118 can further include a lock or lock assembly for locking with the luggage component 112 and maintaining the luggage assembly 110 in the first position. The support frame 116 includes a first position as illustrated in FIG. 5 in which an end 134 thereof does not generally extend beyond the luggage component 112 and a second position as illustrated in FIG. 6 in which the support frame 116 extends beyond the luggage component 112.

As illustrated in FIG. 6, a pivotable device 124 is carried by the support frame 116. The pivotable device 124 may be any appropriately configured structure or design. The pivotable device 124 is illustrated as a hinged assembly interacting with the luggage component 112, though the pivotable device 124 may take on any appropriately configured shape or design. The pivotable device 124 is configured for allowing pivotable movement of the luggage component 112 about the support frame 116.

The support frame 116 is illustrated as one or more telescopic assemblies 130 that cooperatively define a support area 120 that is provided for supporting additional luggage components 22. The support frame 116 may define one or more wheeled assemblies 132 at the second end 134 thereof that are carried by the wheeled cart 118.

The support frame 116 may also include an end support 136 that extends perpendicularly therefrom for enclosing an end of the support area 120. As illustrated in FIG. 7, this may be a scissor shaped design of a pair of members as illustrated, or may take on any appropriately configured configuration. The end support 136 may be provided so that additional luggage components 122 may be stacked upon the support frame 116 in the support area 120.

The assembly 110 is particularly advantageous because of the pivotable capability of the support assembly 114 relative to the luggage component 112. In this manner, the user may stack additional luggage components 122 onto the support assembly 114 and then pivot the luggage component 112 into an angle appropriate for being pulled by the user. The advantage of this configuration is that the user can easily maneuver the assembly 110 while pulling thereon. The user operates the assembly 110 by extending the support assembly 114 from the first position to the second extended position. The end support 136 is then either installed upon the support assembly 114 or, with extendable or retractable versions, placed into an extended position. Additional luggage components 122 are then provided within the support area 120. Upon providing an appropriate number of additional luggage components 122, the user then pivots the luggage component 112 into a desired orientation and pulls the entire assembly 110 to a desired location.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A luggage assembly, the assembly comprising:
a luggage component having a pair of support wheels rotatable about a common axis and defining a trailing edge and a leading edge about which the common axis is formed; and
a support frame configured for extending from the common axis of the luggage component towards the trailing edge between a first position and a second position spaced-apart from the luggage component and defining a support area therebetween for supporting additional luggage components, wherein the luggage component is pivotable about the common axis relative to the support frame without a change in orientation of the support area.

2. The support assembly of claim 1, wherein the support frame comprises one or more telescopic assemblies.

3. The support assembly of claim 2, wherein the one or more telescopic assemblies cooperatively define the support area.

4. The support assembly of claim 1, wherein the support frame defines one or more wheeled assemblies at a second end thereof.

5. The support assembly of claim 1, wherein the support frame further defines an end support that extends perpendicularly therefrom.

6. A luggage assembly comprising:
a luggage component defining a pair of spaced-apart wheel assemblies and a common axis therebetween; and
a support assembly for use with the luggage component, the assembly comprising a support frame having a leading edge and a trailing edge and being configured for extending from the luggage component between a first position in which the support frame is substantially beneath the luggage component and a second position extended from the luggage component and defining a support area therebetween for supporting additional luggage components,
wherein the luggage component is pivotable about the common axis relative to the support frame.

7. The luggage assembly of claim 6, wherein the support frame comprises one or more telescopic assemblies.

8. The luggage assembly of claim 7, wherein the one or more telescopic assemblies cooperatively define the support area.

9. The luggage assembly of claim 6, wherein the support frame defines one or more wheeled assemblies at a second end thereof.

10. The luggage assembly of claim 6, wherein the support frame further defines an end support that extends perpendicularly therefrom.

11. A luggage assembly comprising:
a luggage component defining a pair of spaced-apart wheel assemblies about a common axis thereof; and
a support assembly for use with the luggage component, the support assembly comprising:
a support frame defining a leading edge and a trailing edge and configured for extending from the common axis of the luggage component between a first position towards the trailing edge in which the support frame is substantially beneath the luggage component and a second position extended from the luggage component and defining a support area therebetween for supporting additional luggage components; and
a pivotable device carried by the common axis and extending between spaced-apart wheel assemblies of the luggage component and configured for allowing pivotable movement of the luggage component about the support frame without a change in orientation of the support area.

12. The luggage assembly of claim 11, wherein the support frame comprises one or more telescopic assemblies that cooperatively define the support area.

13. The luggage assembly of claim 11, wherein the support frame defines one or more wheeled assemblies at a second end thereof.

14. The luggage assembly of claim 11, wherein the support frame further defines an end support that extends perpendicularly therefrom.

15. The luggage assembly of claim 11, wherein the luggage component includes a handle for allowing maneuverability by an operator.

* * * * *